July 18, 1967
A. F. PASCUAL
3,331,479
SYSTEM OF COMBINED ACCELERATOR AND BRAKE
PEDAL CONTROL FOR AUTOMOBILES
Filed Aug. 18, 1965
2 Sheets-Sheet 1
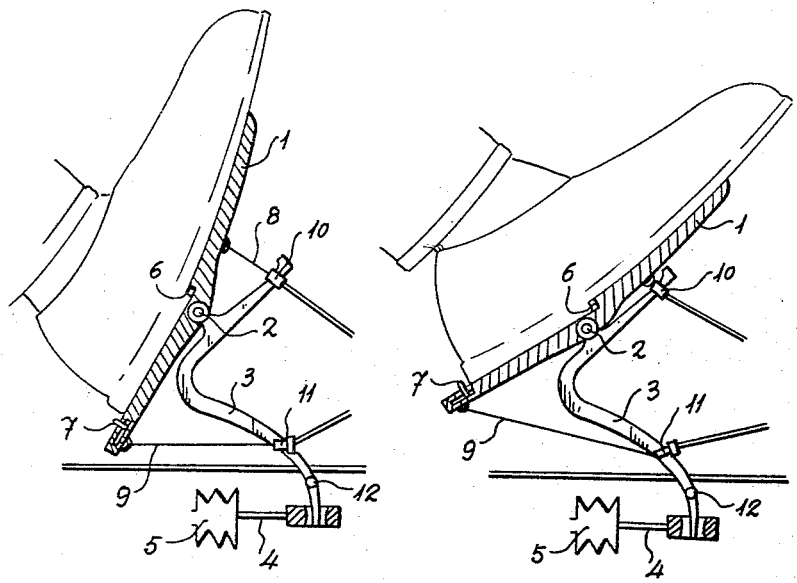
Fig. 1
Fig. 2
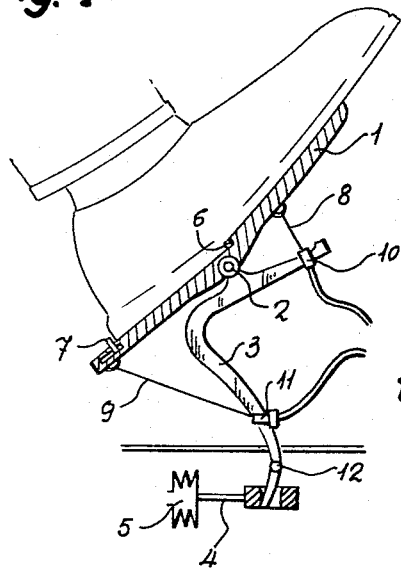
Fig. 3
INVENTOR
Antonio Frontera Pascual
BY James A. Lamb
ATTORNEY

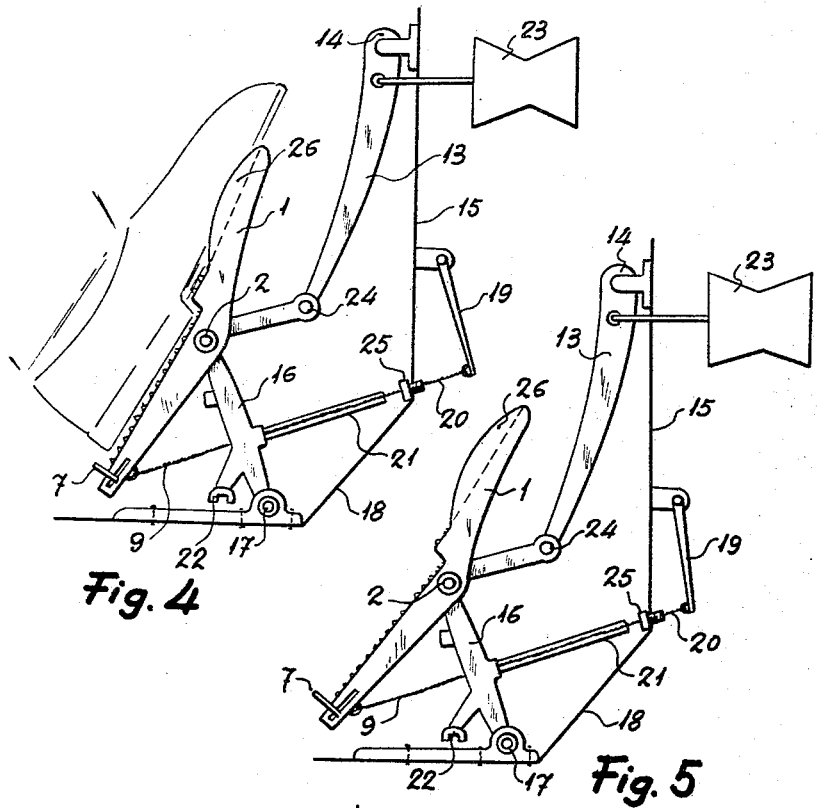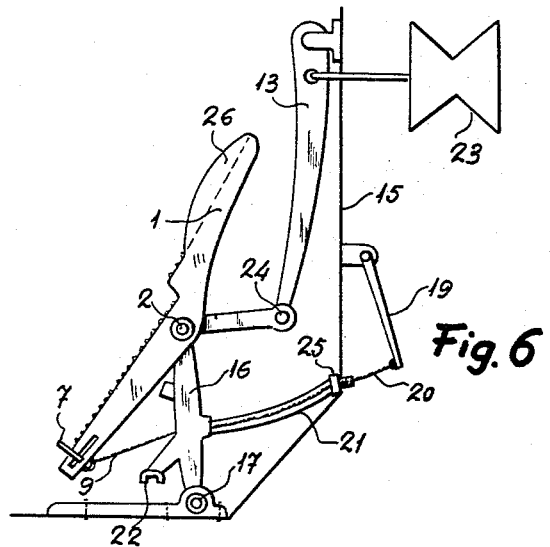

United States Patent Office 3,331,479
Patented July 18, 1967

3,331,479
SYSTEM OF COMBINED ACCELERATOR AND BRAKE PEDAL CONTROL FOR AUTOMOBILES
Antonio Frontera Pascual, Francisco Sitjar 4, Palma de Mallorca, Spain
Filed Aug. 18, 1965, Ser. No. 480,724
4 Claims. (Cl. 192—3)

ABSTRACT OF THE DISCLOSURE

The combined accelerator and brake pedal control of this invention comprises a single pedal pivotally mounted on one end of a lever, the other end of which is adapted to be pivotally mounted on the floor of the vehicle. The pedal has a heel-engageable portion located below and a sole-engageable portion located above its pivotal axis. The heel-engageable portion is connected by a link to the throttle-operating lever. A brake-operating lever is pivotally mounted on the vehicle and connecting rod pivotally connects such lever to said pedal in the vicinity of its pivotal axis. Magnetic means are provided for releasably holding the pedal in brake release position. Means are also preferably provided for indicating throttle opening movement beyond a certain degree.

---

The subject of the present descriptive memorandum is a combined accelerator and brake pedal control system for automobiles.

At the present time, as is known, automobiles are equipped with independent pedal controls for operating the accelerator and the brake, these pedals being operated by the right foot, and since the two functions are opposed and incompatible it is necessary to leave one pedal free in order to operate the other.

Any car driver has been able to verify that the change of position of the foot, so that it may pass from one pedal to the other, needs a determined time, the duration of which depends on the skill and capacity for reaction of the driver, which time, added to that necessary to reduce the speed of the automobile until it comes to a complete stop, is translated into a greater distance covered by the car from the moment that the driver perceives the need to brake until the car stops.

Thus, for example, assuming a time of three tenths of a second to effect the change from one pedal to the other in a travelling at sixty kilometers per hour, the distance supplementary to the normal braking distance will be five meters, and obviously considerably distance on the elimination of which there may depend a serious accident.

The invention essentially consists in the realization of a joint pedal control for operating the brake and the accelerator, arranged in such a form that its action to effect one or the other function is carried out without the possibility of error, and without one function interfering with the other.

With the aim of facilitating a more exact interpretation of the object of the patent for which application is being made, in the attached drawings, complementary to the present exposition, there is shown in FIGS. 1, 2 and 3 a practical form for its industrial implementation which has served as a basis, after successive improvements, to achieve the industrial implementation shown in FIGS. 4, 5 and 6, all of which drawings are included with a merely informative character concerning the invention, and, consequently, are not exhaustive.

In the said drawings:

FIG. 1 is a schematic lateral view of a combined pedal control, effected in accordance with the terms of the invention, in a rest position, that is to say without operating on either the accelerator or brake devices.

FIG. 2 is a view similar to the foregoing, but with the pedal in the position of acting on the accelerator device.

FIG. 3 is a view similar to the foregoing, but with the control pedal in the position of acting on the braking device, with elimination of its action on the acceleration device.

FIG. 4 corresponds to a lateral schematic view of the system, in accordance with the present improvements, with the pedal in the rest position, that is to say neither accelerating nor braking.

FIG. 5 is a similar view, but shown in the accelerating position.

FIG. 6 is a similar view, but shows the pedal in the position of braking and deaccelerating at the same time.

As has already been indicated, the pedal control constructed in accordance with the terms of the invention serves to brake or accelerate either separately or at the same time, as may be required.

The accelerator is constituted by a rocking pedal 1 which turns on the axis 2, such pedal being adjusted to the form of the sole of the shoe by means of the fitting between the stop 6 and the adjusting device 7, of sliding type for the heel, this device being constituted by a cursor adjustable by means of a screw to the shoe on the right foot of the driver, with the aim that the point of articulation 2 shall always be more advanced towards the front of the foot than the line of action of the thrust of the foot, which can be situated in the continuation of the axis of the leg.

The said axis 2 is endowed with a pressure device, composed, for example, of a small wheel and spring, to provide the said joint with more or less resistance, it being adjustable at the will of the user to achieve greater comfort and facility of maneuver.

The rocking pedal 1 is fitted in the form indicated on the support 3 articulated at 12 to a fixed part of the car, which serves to operate the brake on being connected through the rod 4 to the brake device 5, that is to say in the actual form of assembly of the brake.

The pedal 1 is connected to the carburettor by means of two cables 8 and 9, the first in the middle part of the pedal and its sheath fixed in that of the upper end 10 of the brake lever 3, and the second in the lower end, its sheath being fixed in the middle part 11 of the said brake lever.

Evidently the brake device 5, represented in schematic form, may be of any type employed in cars, since as has been indicated, this part does not need any modification.

The control being thus constituted, in order to accelerate it suffices to rotate the pedal 1 with the foot on the axis 2 in a clockwise direction without pushing the lever 3, and to de-accelerate, to rotate the pedal in the opposite direction.

In order to brake, it suffices to push the pedal 1 with the heel, with sufficient force as to de-accelerate so that on the heel butting against the lower part of the lever it will overcome the resistance of the latter, causing it to rotate and act on the braking device.

When the pedal is in the position of acceleration, it is possible to brake with complete safety, even thrusting with the whole of the foot, that is to say applying all the force to the axis 2, since on the lever 3 rotating in a forward direction the pedal 1 rotates in the direction of deacceleration, because of the foot rotating normally on its joint. Thus the action of braking is achieved simultaneously with that of de-acceleration, that is to say in accordance with the normal process that is at present carried out with the change of the foot from one pedal to the other.

All that has been explained in the foregoing paragraphs has served as a basis to introduce certain improvements into the device which is the object of this invention.

In effect, subsequent studies and tests have made it possible to introduce certain variants of the implementation of the device, without affecting its essence in any way, and which make it possible to facilitate its application especially to cars equipped with a brake pedal with a jointed lever in the upper part, without excluding those which are articulated in the lower part.

Likewise there has been studied the manner of eliminating one of the two cables of the accelerator, employing the same regulating device installed in the carburettor intended to facilitate, in a secure manner, the return of the carburettor to the "slow-down" position.

Another improvement introduced consists in equipping the rocking lever which serves as a support for the pedal with a retaining element which situates the said support or lever in the operative position, that is to say when the said pedal acts as an accelerator. The said device, which is extremely simple, consists in situating on an arm of the said lever a magnet and its corresponding armature fixed on the floor of the car, so that if the pedal is operated to accelerate, the said lever remains perfectly fixed, and when it is necessary to brake, it is easy to overcome the attracting action of the magnet.

With the aim of facilitating a more exact interpretation of these improvements, in FIGS. 4, 5 and 6 there is shown a practical form for its industrial putting into practice, this form being included with a merely informative character, and consequently non-limitative insofar as the invention is concerned.

As is shown in the above-mentioned drawings, the padel 1, equipped with a step in its middle part, and an adjustment device 7, as has already been described, is articulated approximately in its middle part at the upper end of the lever 16, in turn articulated at 17 to the floor of the car.

The said lever 16 has a lateral arm on the end of which a magnet 22 is fitted, which coincides in the position represented in FIGS. 4 and 5 and with an iron armature fixed to the floor of the car so that the lever 16 is perfectly retained in the normal position for driving.

The pedal 1 is joined, by means of the cable 9, which goes through the sheath 21, to the lever 19 which acts on the accelerator, the end 20 being joined to the end of the said lever, with which cable there co-operates a regulating device constituted by a hollow screw 25, which screw has on its external part a projection which serves as a stop for the cover or sheath 21. On the said hollow screw there turns a nut which fixes to the plate 15 of the bottom of the car or to an analogous support any auxiliary piece which can be fixed to the complex.

When the brake is not required, the length of the sheath 21 of the cable is a few centimeters less than the total distance between the point of the lever 16 where the sheath 21 starts and the stop constituted by the hollow screw when this is fixed in a forward direction.

On unscrewing the said screw it is possible to regulate and reduce the free travel of the said sheath.

The arrangement of the stop of the sheath causes this latter to be able to be more or less displaced during the operation of the brake pedal; the mission of this device is to obtain a greater or lesser margin of safety at the wish of the user, since on braking the cable of the accelerator is de-tensioned.

The brake lever 13, articulated at 14, and joined in the normal way to the brake pump 23 lacks a pedal, this having been replaced by an axis of articulation 24 which joins the central joint of the pedal 1 by means of a connecting rod.

In accordance with what has been previously described, in the position shown in FIG. 5, on rocking the pedal 1 causing it to rotate in a clockwise direction the cable of the accelerator 9 is tautened, acting as an accelerator of the system.

When the foot presses on the pedal 1, in order to brake, the magnetic union of the magnet 22 is broken, and the rod 16 rocks, causing the connecting-rod between the lever 13 and the pedal to push the said lever 13, producing braking. Simultaneously the pedal 1 rotates on its axis 2 in a counter-clockwise direction, obliging the accelerator to return to the "slow-down" position.

For the purpose of knowing at all times the correct positioning of the foot on the pedal, the latter may be constructed with a stop 26 on one or both of its sides, the stop being of suitable form dimensions.

There can be fitted on the face of the pedal a piece of rubber or similar material, or simply some projecting pieces situated so as to produce greater adherence.

A practical advantage of the present invention is that it is possible to start up the car when it is facing uphill without making use of the hand brake, on permitting the gradual and easily controllable passing of the pedal to the acceleration position from the brake position, as well as permitting a coincidence or overlapping of the two functions.

The nature of the invention having been sufficiently described, as well as practical examples of its industrial implementation, it suffices to add that in the whole and its constituent parts it is possible to introduce changes of material form and arrangement, provided that such alterations do not suppose a substantial variation in the functional object of the invention.

I claim:
1. A combined accelerator and brake pedal control for automobiles which comprises
    (a) a lever having means for pivotally mounting one end thereof on a vehicle for swinging movement about a fixed axis,
    (b) a pedal pivotally mounted on the other end of said lever and being swingable about an axis parallel to said lever axis,
    (c) said pedal having a sole-engageable portion extending in a normally upwardly inclined direction from said pedal axis, and a heel-engageable portion entending in normally downwardly inclined direction from said pedal axis, said pedal having a brake release position and a forward brake applying direction of movement, said heel-engageable portion thereof having a rearward throttle release direction of movement and a forward throttle applying direction of movement,
    (d) a throttle-operating link connected to said pedal heel-engageable portion,
    (e) a brake-operating lever having means for pivotally mounting one end thereof on a vehicle for swinging movement about a fixed axis, and
    (f) a connecting rod having one end pivoted to the other end of said brake-operating lever and another end pivotally connected to said pedal in the vicinity of said pedal axis.
2. A combined accelerator and brake pedal control for automobiles as defined in claim 1, including
    (g) means releasably holding said pedal in said brake release position comprising a magnet carried by said pedal, and a ferro-magnetic armature adapted to be mounted in fixed position on said vehicle.
3. A combined accelerator and brake pedal control for automobiles as defined in claim 2,
    (h) said pedal having a projecting arm carrying said magnet, said armature being engageable by said magnet in said brake release position, and being disengageable from said magnet on movement of said pedal to a brake applying position.
4. A combined accelerator and brake pedal control for automobiles as defined in claim 1, said throttle-operating link comprising a flexible cable, and including

(i) a flexible sheath through which a portion of said cable extends, said sheath having one end in engagement with said first-mentioned lever, and
(j) a stop having a surface in confronting relation to the other end of said sheath,
(k) said cable extending through said stop, and said stop surface being engageable by said other end of said sheath in response to a predetermined degree of brake-applying movement of said pedal, said sheath being thereafter distortable in response to further brake applying movement, said sheath in response to distortion thereof imposing a detachable resistance to said further brake-applying movement.

References Cited

UNITED STATES PATENTS

| 1,664,479 | 4/1928 | Mackean | 192—3 |
| 2,083,940 | 6/1937 | Burton et al. | 192—3 |
| 2,411,167 | 11/1946 | Perry | 192—3 |
| 2,620,050 | 12/1952 | Menard | 192—3 |
| 2,724,469 | 11/1955 | Bailey | 192—3 |
| 2,936,867 | 5/1960 | Perry | 192—3 |
| 3,128,859 | 4/1964 | Griffen | 192—3 |

MARK NEWMAN, *Primary Examiner.*
ARTHUR T. McKEON, *Examiner.*